United States Patent [19]

Stäglich et al.

[11] Patent Number: 5,075,416
[45] Date of Patent: Dec. 24, 1991

[54] NOVEL PROCESS

[75] Inventors: Peter Stäglich, Kempen; Bodo Friedrich, Duisburg; Hans Spengler, Olfen; Robert Zellerhoff, Hamminkeln, all of Fed. Rep. of Germany

[73] Assignee: Rutgerswerke AG, Fed. Rep. of Germany

[21] Appl. No.: 647,607

[22] Filed: Jan. 29, 1991

[30] Foreign Application Priority Data

Apr. 6, 1990 [DE] Fed. Rep. of Germany ....... 4011117

[51] Int. Cl.$^5$ ..................... C08G 73/22; C07C 113/04
[52] U.S. Cl. .................................... 528/179; 528/183; 528/271; 528/215; 526/318; 526/271; 526/272; 534/556
[58] Field of Search ............... 528/271, 179, 183, 265; 526/318, 271, 272; 534/556

[56] References Cited

U.S. PATENT DOCUMENTS

| | | | |
|---|---|---|---|
| 4,289,678 | 9/1981 | Calder et al. | 126/318 |
| 4,482,489 | 11/1984 | DiPippo | 534/556 |
| 4,598,138 | 7/1986 | Lücke et al. | 528/205 |
| 4,772,678 | 9/1988 | Sybert et al. | 528/179 |

*Primary Examiner*—Maurice J. Welsh
*Assistant Examiner*—Duc Truong
*Attorney, Agent, or Firm*—Bierman and Muserlian

[57] ABSTRACT

A process for the preparation of an aromatic hydrocarbon resin modified with aromatic carboxylic acids comprising suspending methane sulfonic acid and at least one aromatic carboxylic acid in an aliphatic solvent and slowly proportioning at least one unsaturated aromatic hydrocarbon into the suspension under polymerization conditions and their salts.

9 Claims, No Drawings

NOVEL PROCESS

STATE OF THE ART

Aromatic hydrocarbon resins which are modified with aromatic carboxylic acids, particularly with aromatic hydroxycarboxylic acids, and whose acid and/or hydroxyl groups are present either as acid or salt are known from EP-B 0,134,592. According to this application, resins are reacted by reaction of unsaturated aromatic hydrocarbons with molten aromatic carboxylic acids or hydroxycarboxylic acids in the presence of a Friedel-Craft catayst at 100° to 160° C. This process has various disadvantages. For instance, the reaction mixture is highly corrosive and the Friedel-Crafts catalysts can be removed from the resin only incompletely, and the separated, washed-out catalysts pollute the wash water.

According to EP-B 0,219,457, salts of salicylic acid-modified styrene resins are produced under the catalytic action of aromatic sulfonic acids but it has been found that it is necessary to operate with aromatic sulfonic acids at 130° to 150° C. to substitute salicylic acid with styrene. Because of this thermal stress, the color of the reaction product is unsatisfactory. Moreover, separation of the catalyst is not possible so that it remains in the reaction product quantitatively. The color of the metal salts subsequently produced therewith is gray to beige which is not desirable for the preferred use of these products as chromogens.

From EP-A 0,303,443, it is known how to produce salts of salicylic acid-modified styrene resins by charging in the reaction mixture the esters thereof, instead of salicylic acid, and hydrolyzing the ester group after complete polymerization. Although the polymerization itself can be carried out at low temperature, the subsequent hydrolysis of the formed substituted salicylic acid ester again requires elevated temperatures so that reddish-brown reaction products are obtained. Besides the color quality, in this process also the complication and increased cost due to the additionally required hydrolysis step is unsatisfactory.

OBJECTS OF THE INVENTION

It is an object of the invention to provide an improved process for the production of acid-modified aromatic hydrocarbon resins and their salts wherein the reaction mixture is as little corrosive as possible, wherein the polymerization takes place as simply as possible and without costly subsequent reaction steps and bright resins or salts are obtained, and wherein the catalyst can be separated and even re-used in a simple manner.

These and other objects and advantages of the invention will become obvious from the following detailed description.

THE INVENTION

The novel process of the invention for the preparation of an aromatic hydrocarbon resin modified with aromatic carboxylic acids comprises suspending methane sulfonic acid and at least one aromatic carboxylic acid in an aliphatic solvent and slowly proportioning at least one unsaturated aromatic hydrocarbon into the suspension under polymerization conditions.

With this simple polymerization, the reaction mixture is only slightly corrosive. As the catalyst is not soluble in the reaction mixture, it can be separated after the completed reaction in a very simple manner and re-used if desired. The polymerization or copolymerization of the unsaturated aromatics with the aromatic from 20° to 200° C., preferably from 80° to 120° C.

This is surprising inasmuch as in this temperature range neither the catalyst nor the aromatic carboxylic acid dissolves in the aliphatic solvent used. It turned out, however, that if the unsaturated aromatic hydrocarbons are proportioned in slowly, enough aromatic carboxylic acid is available as the reaction component so that at the end of the polymerization reaction, the total amount of the aromatic carboxylic acids is incorporated in the resin formed.

The rate at which the unsaturated aromatic hydrocarbons are proportioned in depends on the size of the reaction batch, the reactivity of the unsaturated aromatic hydrocarbons used, and the reaction temperature. The term "proportioned in slowly" must be understood in the sense that the unsaturated aromatic hydrocarbons are added, not all at once, but in several portions, which permit the unsaturated aromatic hydrocarbons introduced first to be substantially polymerized, with incorporation of small amounts of aromatic carboxylic acid, before additional unsaturated aromatics are proportioned in. In a laboratory batch, this is achieved by steady dropping-in of the reaction component. On an industrial scale, the addition of the unsaturated aromatic hydrocarbons takes place continuously over a period of 30 to 120 minutes, depending on the batch size. If the rate of addition is too fast, polymers of the unsaturated aromatic hydrocarbons will form which contain no incorporated aromatic carboxylic acid, so-called neutral resins, besides the resins modified with aromatic carboxylic acids of the invention.

For the areas of use in which the acid-modified resins produced by the invention are to replace natural resins, a proportion of 40% of neutral resins is not disadvantageous. In other uses, as for instance the use as chromogenic resins, neutral resins diminish the quality.

It has been found, however, that the neutral resins can be separated from the acid-modified resins in a simple manner in that after the reaction is complete and after the separation of the methane sulfonic acid, the acid-modified resins are extracted into a water-soluble form with alkali metal hydroxide and thus are separated in aqueous solution. After acidulation of this solution, the acid-modified resins occur in a pure form. But sometimes these resins are desired in the form of their salts with polyvalent metal ions, for instance zinc and these are obtained by reacting the aqueous solutions of the alkali metal salts of these resins with aqueous solutions of salts of the respective polyvalent metals with mineral acids or organic carboxylic acids.

For carrying out the process of the invention, the aromatic carboxylic acid or a mixture of aromatic carboxylic acids and methane sulfonic acid are suspended at room temperature or a temperature in the range up to the desired reaction temperature in an aliphatic solvent. It is clear that the ease of preparing and maintaining the suspension increases as the aromatic carboxylic acids are more finely divided.

Examples of aromatic carboxylic acids are all unsubstituted or substituted mono- or multi-nuclear aromatic carboxylic acids such as 2-, 3-carboxybiphenyl, m-, p-hydroxybenzoic acid, anisic acid, p-ethoxybenzoic acid, p-propoxybenzoic acid, p-benzyloxybenzoic acid, p-phenoxybenzoic acid, gallic acid, anthranilic acid, m-, p-aminobenzoic acid, 3-isopropyl-4-hydroxybenzoic acid, 3-sec.butyl-4-hydroxybenzoic acid, 3-cyclohexyl-4-hydroxybenzoic acid, 3-phenyl -4-hydroxybenzoic acid, 3-benzyl-4-hydroxybenzoic acid, salicylic acid, o-, m-, p-cresotinic acid, 3-, 4-ethylsalicylic acid, 3-isopro- phylsalicylic acid, 3-sec, 5-sec, 3-tert.-butylsalicylic acid 3-, 5-cyclohexyl salicylic acid, 3-, 5-phenylsalicylic acid, 3-, 5-benzyl salicylic acid, 5-tert.-octylsalicylic acid, 3, 5-($\alpha$-methylbenzyl) salicylic acid, 3-, 5-nonylsalicylic acid, 5-($\alpha$-$\alpha$-dimethylbenzyl)-salicylic acid, 3-, 5-chlorosalicylic acid, 3-, 4-, 5-, 6-hydroxysalicylic acid, 3-ethoxysalicylic acid, 3-, 4, 5-methoxysalicylic acid, 5-octoxysalicylic acid, phenylsalicylic acid, -($\alpha$-methylbenzyl-salicylic, $\alpha$,$\alpha$-dimethylbenzyl)-salicylic acid, -(4-tert.-butylphenyl)-salicylic acid, 3-(4'-tert.-octylphenyl)-5-tert.-octylsalicylic acid, 3-[4'-($\alpha$,$\alpha$-dimethylbenzyl) phenyl]-5-($\alpha$,$\alpha$-dimethylbenzyl)-salicylic acid, 3,5-di-$\alpha$-methylbenzylsalicylic acid, 3,5-di-$\alpha$,$\alpha$-dimethylbenzylsalicylic acid, 3-phenyl-5-$\alpha$,$\alpha$-dimethylbenzylsalicylic acid, 3-hydroxysalicylic acid, 1-hydroxy-2-carboxynaphthalene, carboxy-4-isopropylnaphthalene, carboxy-7-cyclohexylnaphthalene or 5-(4'-hydroxybenzyl)-salicylic acid. Preferred acids are o-, m- and p-hydroxybenzoic acid.

Examples of aliphatic solvent are a pure alkane such as n-hexane or n heptane or also benzine fractions whose boiling point range is in the range of the selected reaction temperature. The amount should be sufficient to suspend the aromatic carboxylic acid, usually 0.5 to 2 times the amount by volume, referred to the aromatic carboxylic acid.

The methane sulfonic acid used as catalyst is used in an amount from 0.1 to 20% by weight, based on the aromatic carboxylic acid. Because of recirculation of the methane sulfonic acid, it is safe to use a higher catalyst concentration which makes possible lower reaction temperatures, hence lower thermal load and thus better color quality of the resins produced by the invention.

The unsaturated aromatic hydrocarbons are slowly added to the suspension at the reaction temperature while stirring, the amount of unsaturated aromatic hyrocarbons added being 1 to 4 moles, preferably 0.5 to 2.5 moles based on the amount of aromatic carboxylic acid.

Examples of unsaturated aromatic compounds suitable for the production of the resins of the invention are indene, styrene, $\alpha$-methylstyrene, methyl indene or vinyl toluene which can be used as pure substances or in mixture. Other usable polymerizable aromatic hydrocarbon mixtures are the distillates boiling in the temperature range of 140° to about 220° C., from high-temperature coal tar, or unsaturated aromatic hydrocarbons formed in the cracking of naphtha or gas oil as well as in the pyrolysis of cracking residues and concentrated in a fraction boiling in the range of from 160° to 220° C., the so-called resin oil fraction. These fractions contain as unsaturated aromatic compounds essentially indene, vinyl toluene, methyl indene, cumarone, dicyclopentadiene, methylcyclopentadiene, styrene and $\alpha$-methyl styrene in a concentration of 50 to 70% besides non-reactive aromatic compounds.

In the course of the addition of the unsaturated aromatic compounds, the dispersed aromatic carboxylic acid is gradually transformed into benzine-soluble derivatives. After the complete addition of the unsaturated aromatics, a homogeneous, light brown benzine solution of the reaction products is obtained in which the methane sulfonic acid is finely dispersed by the stirring. Since after completed addition of the unsaturated aromatics and stopping of the stirrer, the methane sulfonic acid can be separated and recirculated by gravity, centrifugal decanters or the like. The process of the invention has the outstanding features of being of the invention has the outstanding features of being environment-friendly, low catalyst costs, and safety of the resins made by the invention in terms of occupational medicine.

After completed reaction and separation of the catalyst which can be done by gravity (settling), centrifugal decanters or the like, in the preferred mode of the process of the invention, the benzine solution is extracted with an equimolar quantity of 5 to 10% alkali metal hydroxide. In this manner, the compounds which due to their hydroxy- and carboxylic acid groups are alkali-soluble, are freed from the alkali-insoluble neutral resin molecules which remain in the aliphatic solvent. After distillation of the solvent, the neutral resin can advantageously be used for the uses normal for soft resins, e.g. as modifying agent for epoxy resin and polyurethane systems, plasticizers or tack promoters in SBS, ABS, EVA, etc.

From the alkali metal salt solution of the aromatic hydrocarbon resins modified with aromatic carboxylic acid, the neutral resin-free resin modified with hydroxyl and acid groups can subsequently precipitated by acidulation. However, from the alkali metal solution of the aromatic hydrocarbon resins modified with aromatic carboxylic acids, the respective metal salt of the substituted hydroxycarboxylic acids can be obtained at ambient temperature, possibly also at elevated temperature by double reaction with a solution of a polyvalent metal salt. Examples of salts are those of mineral acids or low molecular weight carboxylic acids where the cation may be aluminum, tin, zirconium and preferably zinc. There forms an aqueous, white dispersion of the metal salt of the alkali metal solution of the aromatic hydrocarbon resins modified with aromatic carboxylic acids which can be used, after pulverizing to a fineness of 1 to 5 um, as coating dispersion for the production of chromogen-coated pressure- and heat-sensitive recording materials.

The chromogens which are to be combined with the developer made by the invention, may belong e.g. to the classes of phthalides, azophthalides, fluoranes, spiropyranes, spirodipyranes, azomethines, quinazolines, leucoauramines, triarylmethane leucodyes, carbazolyl methanes, rhodamine lactams, chromenopyrazoles, phenoxazines, phenothiaznes or chroman dyes.

In the following examples there are several preferred embodiments to illustrate the invention. However, it should be understood that the invention is not intended to be limited to the specific embodiments.

EXAMPLE 1

200 g of salicylic acid and 20 g of methane sulfonic acid were suspended at 40° to 66° C. in 300 ml of n-hexane, and 500 g of a distillate fraction boiling between 160° to 220° C. of coal tar containing 65% unsaturated aromatic compounds were added with stirring at so slow a rate that the addition was completed after 90 minutes. This was followed by heating for another hour with stirring at reflux and then the stirring was stopped. The methane sulfonic acid settling out was separated and the remaining reaction mixture was distilled to a temperature of 250° C. to obtain a residue of 525 g of a resin having a softening poin: (Kraemer-Sarnow) of 60°

C. and a brightness B1. The resin could be used in printing inks and in aqueous lacquer systems.

EXAMPLES 2 to 8

Using the procedure of Example 1, 138 g of salicylic acid and 10 g of methane sulfonic acid were suspended in 100 ml of n-hexane and mixed at 40° to 66° C. with 260 g of styrene. The addition of styrene was finished after 60 minutes. After processing by separating the methane sulfonic acid, extraction with 10% sodium hydroxide solution, and precipitation of the reaction product of styrene and salicylic acid from its sodium salt solution with HCl, there resulted a yield of 61% (based on salicylic acid+styrene) of a light yellow soft resin. Processing of the n-hexane phase yielded 35% styrene resin. 35% styrene resin.

Analogously thereto, additional test were carried out under modified conditions. The reaction conditions and results are contained in the following table.

TABLE

| Example | 2 | 3 | 4 | 5 | 6 | 7 | 8 |
|---|---|---|---|---|---|---|---|
| Salicylic acid (g) | 138 | 138 | 138 | 138 | 138 | 138 | 138 |
| n-Hexane (g) | 100 | 100 | | | | | |
| Benzine 100/125° C. (g) | | | 100 | 100 | 100 | | |
| Benzine 140/200° C. (g) | | | | | | 100 | 100 |
| Methanesulfonic a. (g) | 10 | 33 | 33 | 20 | 20 | 33 | 10 |
| Styrene (g) | 260 | 260 | 260 | 260 | 260 | 260 | 260 |
| Divinyl benzene (g) | | | | | | | |
| Starting temp. (°C.) | 40 | 40 | 90 | 100 | 100 | 115 | 100 |
| Maximum temp. (°C.) | 66 | 68 | 104 | 106 | 104 | 142 | 105 |
| Reaction time (min) | 60 | 60 | 60 | 90 | 90 | 60 | 60 |
| Yield (%) | 61 | 63 | 69 | 78 | 74 | 69 | 61 |
| Neutral resin (%) | 35 | 32 | 27 | 17 | 19 | 29 | 36 |
| Acid number (mg KOH/g) | 205 | 212 | 190 | 181 | 170 | 194 | 203 |
| Brightness (% T) | 98 | 98 | 97 | 95 | 96 | 95 | 97 |
| Solubility in NaOH | good | good | good | good | good | good | good |

EXAMPLE 9

245 g of salicylic acid and 35 g of methane sulfonic acid were suspended in 175 ml of benzine 100/125 and mixed at 110° C. with 465 g of styrene. The addition of styrene was completed after 60 minutes. After addition of another 575 g of benzine 100/125 and of 1,340 g of 6.4% sodium hydroxide solution, the phases were separated. The aqueous-alkaline solution of the saliyclic acid-containing resin was reextracted with 450 g of benzine and freed from benzine residues by distillation to obtain 1,931 g of an aqueous approx. 33% solution of the sodium salt which corresponds to a yield of 91% of the therory referred to saliylic acid employed.

EXAMPLE 10

245 g of salicylic acid and 35 g of methane sulfonic acid were suspended in 175 ml of benzine 100/125 and mixed at 110° C. with 465 g of styrene. The addition of styrene was completed after 60 minutes. After addition of another 575 g of benzine 100/125, the mixture was extracted with 1,230 g of water resulting in 1,207 g of waste water, from which the methane sulfonic acid as well as unreacted salicylic acid were recovered as residue by evaporation and were recycled. The alkali-soluble main product was extracted from the polymer solution with 1,340 g of 6.4% sodium hydroxide solution. The aqueous-alkaline solution of this resin was reextracted with 450 g of benzine and freed from benzine residues by distillation to obtain 1,890 g of an aqueous approx. 34% solution of the sodium salt which corresponds to a yield of 90% of the theory referred to salicylic acid employed.

EXAMPLE 11

286 g of zinc sulfate solution (15% zinc sulfate) were weighed in and mixed while stirring with 300 g of a 30% solution of the sodium salt from Example 9 to obtain a white dispersion of the zinc salt, which can serve as chromogenic component in paper coatings for pressure- or heat-sensitive recording materials.

Various modifications of the process of the invention may be made without departing from the spirit or scope thereof and it is to be understood that the invention is intended to be limited only as defined in the appended claims.

What we claim is:

1. A process for the preparation of an aromatic hydrocarbon resin modified with aromatic carboxylic acids comprising suspending methane sulfonic acid and at least one aromatic carboxylic acid in an aliphatic solvent and slowly proportioning at least one unsaturated aromatic hydrocarbon into the suspension under polymerization conditions.

2. The process of claim 1 wherein the polymerization is effected at 20° to 200° C.

3. The process of claim 1 wherein the polymerization is effected at 80° to 20° C.

4. The process of claim 1 wherein the aliphatic solvent is a benzine with a boiling point of 100° to 125° C.

5. The process of claim 1 wherein the unsaturated aromatic hydrocarbon is at least one member of the group consisting of styrene and -methyl-styrene.

6. The process of claim 1 wherein the aromatic carboxylic acid is o-, m- or p-hydroxy benzoic acid.

7. The process of claim 1 wherein the unsaturated aromatic hydrocarbon is a fraction with a boiling range of 140° to 220° C.

8. The process of claim 1 wherein the methane sulfonic acid is separated from the reaction mixture and extracting the reaction-mixture with an alkali metal hydroxide to obtain the alkali metal salt of the aromatic hydrocarbon resin modified with aromatic carboxylic acid.

9. The process of claim 8 wherein an aqueous solution of the alkali metal salts is reacted with a polyvalent metal salt of a mineral acid or an organic carboxylic acid.

* * * * *